United States Patent
Kang et al.

(10) Patent No.: US 9,930,708 B2
(45) Date of Patent: Mar. 27, 2018

(54) METHOD OF RECONNECTING MASTER DEVICE AND SLAVE DEVICE

(71) Applicant: SAMSUNG ELECTRONICS CO., LTD., Suwon-si (KR)

(72) Inventors: Pil-seob Kang, Suwon-si (KR); Seong-il Hahm, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/677,457

(22) Filed: Apr. 2, 2015

(65) Prior Publication Data

US 2015/0289308 A1    Oct. 8, 2015

(30) Foreign Application Priority Data

Apr. 2, 2014   (KR) .................. 10-2014-0039576

(51) Int. Cl.
| | |
|---|---|
| *H04B 7/00* | (2006.01) |
| *H04W 76/02* | (2009.01) |
| *H04W 4/00* | (2018.01) |
| *H04W 12/06* | (2009.01) |
| *H04W 8/00* | (2009.01) |
| *H04W 84/20* | (2009.01) |

(52) U.S. Cl.
CPC ......... *H04W 76/023* (2013.01); *H04W 4/008* (2013.01); *H04W 12/06* (2013.01); *H04W 8/005* (2013.01); *H04W 76/028* (2013.01); *H04W 84/20* (2013.01)

(58) Field of Classification Search
CPC .... H04W 4/008; H04W 76/023; H04W 12/06
USPC ........................................................ 455/41.2
See application file for complete search history.

(56) References Cited

U.S. PATENT DOCUMENTS

| | | | |
|---|---|---|---|
| 2002/0161853 A1* | 10/2002 | Burak | .................... G06Q 40/04 709/218 |
| 2005/0213593 A1 | 9/2005 | Anderson et al. | |
| 2008/0280559 A1 | 11/2008 | Dandekar et al. | |
| 2009/0247883 A1 | 10/2009 | Miyazaki et al. | |
| 2009/0271514 A1* | 10/2009 | Thomas | .............. G06F 11/3438 709/224 |
| 2010/0056055 A1 | 3/2010 | Ketari | |
| 2010/0130130 A1 | 5/2010 | Liu | |

(Continued)

FOREIGN PATENT DOCUMENTS

| | | |
|---|---|---|
| EP | 2323460 A2 | 5/2011 |
| EP | 2582160 A1 | 4/2013 |

(Continued)

OTHER PUBLICATIONS

Search Report and Written Opinion dated Jun. 19, 2015 issued by the International Searching Authority in counterpart International Patent Application No. PCT/KR2015/003187 (PCT/ISA/210 and PCT/ISA/237).

(Continued)

*Primary Examiner* — Eugene Yun
(74) *Attorney, Agent, or Firm* — Sughrue Mion, PLLC

(57) ABSTRACT

A method of automatically reconnecting a master device and a slave device performed by the master device includes performing a pairing operation with the slave device, connecting to the slave device when the pairing operation is finished, and attempting to reconnect to the slave device according to whether an unpairing message is received from the slave device.

14 Claims, 9 Drawing Sheets

(56) References Cited

U.S. PATENT DOCUMENTS

| | | |
|---|---|---|
| 2010/0178911 A1 | 7/2010 | Dailey |
| 2011/0293095 A1 | 12/2011 | Ben Ayed |
| 2013/0017816 A1 | 1/2013 | Talty et al. |
| 2015/0024678 A1* | 1/2015 | Chang ................ H04W 76/023 455/39 |

FOREIGN PATENT DOCUMENTS

| | | |
|---|---|---|
| EP | 2651179 A1 | 10/2013 |
| JP | 4666319 B2 | 4/2011 |
| WO | 2012/061440 A2 | 5/2012 |

OTHER PUBLICATIONS

Communication dated Oct. 16, 2017, from the European Patent Office in counterpart European Application No. 15772367.7.

* cited by examiner

METHOD OF RECONNECTING MASTER DEVICE AND SLAVE DEVICE

RELATED APPLICATION

This application claims priority from Korean Patent Application No. 10-2014-0039576, filed on Apr. 2, 2014, in the Korean Intellectual Property Office, the disclosure of which is incorporated herein by reference in its entirety.

BACKGROUND

1. Field

Apparatuses and methods consistent with exemplary embodiments relate to reconnecting a master device and a slave device.

2. Description of the Related Art

Bluetooth is a communications protocol in which data is transmitted or received between electronic devices at a high speed by using a wireless frequency without physical communication cables. Also, Bluetooth may be used for wireless communication between various devices at a speed of 1 Mbps (actual effective speed of 721K), and transmit and receive radio waves by using frequency-hopping spread spectrum technology to switch between 79 channels having a bandwidth of 1 MHz to 2.4 GHz, or 1,600 times per second. In addition, Bluetooth does not consume a lot of power. Therefore, Bluetooth may avoid interfering with other signals by quick recognition and by using the frequency-hopping spread spectrum technology, and may stably transmit and receive data by using quicker and shorter packets in comparison to other systems that operate in the same frequency range.

SUMMARY

Aspects of one or more exemplary embodiments provide a method of automatically reconnecting a master device and a slave device.

Aspects of one or more exemplary embodiments provide a method of automatically reconnecting a wireless communication device and a wearable device.

Aspects of one or more exemplary embodiments include a non-transitory computer-readable recording medium having recorded thereon a program, which, when executed by a computer, performs the methods above.

Additional aspects will be set forth in part in the description which follows and, in part, will be apparent from the description, or may be learned by practice of the presented exemplary embodiments.

According to an aspect of an exemplary embodiment, there is provided a method performed by the master device of automatically reconnecting a master device and a slave device, including performing a pairing operation with the slave device; connecting to the slave device in response to completing the pairing operation; and attempting to reconnect to the slave device according to whether an unpairing message is received from the slave device.

The attempting to reconnect to the master device may include not attempting reconnection in response to the unpairing message being received from the slave device.

The attempting to reconnect to the master device may include attempting reconnection while the unpairing message is not received from the slave device.

The master device and the slave device may be wirelessly connected to each other via Bluetooth.

The performing the pairing may include authenticating the master device.

The unpairing message may include terminating the authentication of the master device.

The unpairing message may be transmitted in packets.

The slave device may be a wearable device.

According to an aspect of another exemplary embodiment, there is provided a method performed by a slave device of automatically reconnecting a master device and the slave device, the method including performing a pairing operation with the master device; connecting to the master device in response to completing the pairing operation; and attempting to reconnect to the master device according to whether an unpairing message is transmitted to the master device.

The attempting to reconnect to the master device may include not attempting reconnection in response to the unpairing message being transmitted to the master device.

The attempting to reconnect to the master device may include attempting reconnection while the unpairing message is not transmitted to the master device.

The master device and the slave device may be wirelessly connected to each other via Bluetooth.

The performing the pairing may include authenticating the master device.

The unpairing message may be for terminating the authentication of the master device.

The unpairing message may be transmitted in packets.

The slave device may be a wearable device.

The attempting to reconnect to the master device may include transmitting the unpairing message in response to receiving an unpairing request from a user via an application.

According to an aspect of another exemplary embodiment, there is provided a master device including a wireless communication handler configured to perform a pairing operation with a slave device and determine whether to reconnect to the slave device according to whether an unpairing message is received from the slave device; and a wireless communication stack configured to perform wireless communication with the slave device under the control of the wireless communication handler.

When the unpairing message is received by the master device, the connection controller may be configured to control the wireless connector such that the wireless connector stops attempting to reconnect to the slave device.

When the unpairing message is not received by the master device, the connection controller may be configured to attempt reconnection.

The master device and the slave device may be wirelessly connected to each other via Bluetooth.

The connection controller may authenticate the master device by using data received from the master device.

The unpairing message may be configured to terminate the authentication of the master device.

The wireless connector may be configured to transmit the unpairing message in packets.

The slave device may be a wearable device.

According to an aspect of another exemplary embodiment, there is provided a slave device including a connection controller configured to perform a pairing operation with a master device and determine whether to reconnect to the master device according to whether an unpairing message is transmitted to the master device; and a wireless connector configured to perform wireless communication with the master device under the control of the wireless communication handler.

In response to transmitting the unpairing message to the master device, the connection controller may be configured to control the wireless connector to stop attempting to reconnect to the master device.

While the unpairing message is not transmitted to the master device, the connection controller may be configured to attempt to reconnect to the master device.

The master device and the slave device may be configured to be wirelessly connected to each other via Bluetooth.

The connection controller may be configured to authenticate the master device by using data received from the master device.

The unpairing message may be configured to terminate the authentication of the master device.

The wireless connector may be configured to transmit the unpairing message in packets.

The slave device may be configured to be a wearable device.

The slave device may further include an application processor configured to receive a command from a user and provide the command to the connection controller, and when an unpairing request is received from the user, the connection controller may be configured to control the wireless connector to transmit the unpairing message to the master device.

According to an aspect of another exemplary embodiment, there is provided a method of reconnecting a first electronic device with a second electronic device, the method including in response to the first electronic device being disconnected from the second electronic device, determining whether a request for unpairing was received by the first electronic device; and attempting to reconnect the first electronic device with the second electronic according to the determination.

The attempting to reconnect may include cancelling the attempt to reconnect if the request for unpairing was received.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
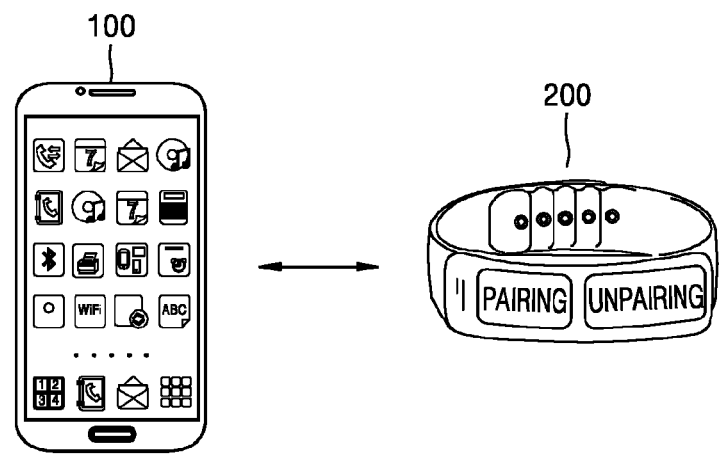
FIG. 1 is a diagram illustrating a method of automatically reconnecting a master device and a slave device, according to an exemplary embodiment.

As the disclosure allows for various changes and numerous embodiments, exemplary embodiments will be illustrated in the drawings and described in detail in the written description. However, this is not intended to limit the disclosure to particular modes of practice, and it is to be appreciated that any changes, equivalents, and substitutes that do not depart from the spirit and technical scope are encompassed in the disclosure. In the description, certain detailed explanations of the related art may be omitted when it is deemed that they may unnecessarily obscure the essence of the inventive concept. As used herein, the term "and/or" includes any and all combinations of one or more of the associated listed items. Expressions such as "at least one of," when preceding a list of elements, modify the entire list of elements and do not modify the individual elements of the list.

Although the terms including an ordinal number such as first, second, etc., can be used illustrating various elements, the structural elements are not restricted by the terms. The terms are only used to distinguish one element from another element. For example, without departing from the scope of the present disclosure, a first structural element may be named a second structural element. Similarly, the second structural element also may be named the first structural element.

The terms used in the present disclosure are merely used to describe particular embodiments, and are not intended to limit the inventive concept. An expression used in the singular encompasses the expression of the plural, unless it has a clearly different meaning in the context. In the present disclosure, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Furthermore, in the description of exemplary embodiments, a "module" or a "unit" may perform at least one function or operation and may be embodied as hardware or software or as a combination of hardware and software. Also, a plurality of "modules" or a plurality of "units" may be integrated into at least one module except a "module" or a "unit" that may be embodied as particular hardware, to be embodied as at least one processor.

Aspects of one or more exemplary embodiments of the present disclosure will be described in detail with reference to the accompanying drawings. Like reference numerals in the drawings denote like elements, and thus their description may not be repeated.

FIG. 1 is a diagram illustrating a method of automatically reconnecting a master device 100 and a slave device 200, according to an exemplary embodiment. Referring to FIG. 1, when the master device 100 and the slave device 200 receive an unpairing request from a user, the master device 100 and the slave device 200 may transmit an unpairing message so that reconnection is not unnecessarily attempted.

The master device 100 and the slave device 200 may perform a discovery process. The master device 100 or the slave device 200 may search for an adjacent communication device. The master device 100 or the slave device 200 may receive a search request via an input unit (e.g., inputter) from the user to search for an adjacent communication device capable of wireless communication, such as Bluetooth or Wi-Fi. In order to reduce power consumption, the master device 100 or the slave device 200 might search for an adjacent communication device only when there is a search request from the user.

The master device 100 may search for the slave device 200 when the slave device 200 is near the master device 100, and the slave device 200 may search for the master device 100 when the master device 100 is near the slave device 200. When the search is finished, the master device 100 or the slave device 200 may display found communication devices on a display. The user may select a device from among the communication devices displayed to be connected via wireless communication.

The master device 100 and the slave device 200 may perform a pairing operation. Pairing refers to a process for authenticating devices. The master device 100 and the slave device 200 may search for adjacent communication devices and select a communication device to be connected via wireless communication. Various authentication methods may be used. For example, the user may perform authentication by inputting a personal identification number (PIN) code.

Pairing information is secured. Therefore, even when the master device 100 and the slave device 200 are disconnected, the master device 100 and the slave device 200 may be reconnected without an additional authentication process (pairing). However, if the pairing information is deleted, the pairing operation needs to be performed again to connect the master device 100 and the slave device 200.

The master device 100 and the slave device 200 may be connected via wireless communication. When the master device 100 and the slave device 200 are selected by the user, the master device 100 or the slave device 200 is connected to the other via wireless communication. Wireless communication is a communication method of transmitting and receiving data between devices that are near one another, such as Bluetooth or Wi-Fi.

By using an auto-connection technology, when the master device 100 and the slave device 200 are disconnected, the master device 100 and the slave device 200 may be automatically reconnected to one another without an additional input when the master device 100 and the slave device 200 are in a reconnectable state. For example, when Bluetooth is OFF on the slave device 200, the master device 100 attempts reconnection with the slave device 200. When Bluetooth is turned ON on the slave device 200, the master device 100 is automatically reconnected to the slave device 200.

The slave device 200 may transmit an unpairing message to the master device 100. The slave device 200 may receive an unpairing request from the user via the input unit. When the slave device 200 receives the unpairing request, the slave device 200 may transmit the unpairing message to the master device 100 and disconnect from the master device 100. When the unpairing occurs in this way, the slave device 200 may not attempt to reconnect to the master device 100 before a pairing request is received from the user.

The master device 100 may attempt auto-connection with the slave device 200 depending on whether or not an unpairing message is received. When an unpairing message is received from the slave device 200, the master device 100 may disconnect from the slave device 200 and may not attempt to reconnect to the slave device 200. If the master device 100 did not receive an unpairing message from the slave device 200 and is disconnected from the slave device 200 without user intervention, the master device 100 may attempt to reconnect to the slave device 200.

Although FIG. 1 illustrates an example in which the slave device 200 transmits the unpairing message to the master device 100, the opposite case is also possible. In other words, the master device 100 may transmit an unpairing message to the slave device 200 and stop the slave device 200 from attempting to reconnect to the master device 100.

The master device 100 or the slave device 200 may be electronic devices such as a mobile phone, a tablet PC, a laptop computer, or a wearable device, etc. The wearable device may be an electronic device that may be worn on the body of the user, such as glasses, a bracelet, an armband, an earring, etc.

As shown in FIG. 1, the slave device 200 may display a "PAIRING" button and an "UNPAIRING" button on the display. The user may pair or unpair the slave device 200 with the master device 100 by selecting the "PAIRING" button or the "UNPAIRING" button.

Similar to the slave device 200, the master device 100 may also display a "PAIRING" button and an "UNPAIRING" button on the display. The user may pair or unpair the master device 100 with the slave device 200 by selecting the "PAIRING" button or the "UNPAIRING" button.

When the master device 100 and the slave device 200 are paired but disconnected without user intervention, the master device 100 and the slave device 200 may continuously attempt to connect to one another and thus may consume power. For example, the master device 100 and the slave device 200 may be paired but disconnected when the master device 100 and the slave device 200 are moved apart by a certain distance while they are connected to each other, when one of the master device 100 and the slave device 200 stops wireless communication, or when one of the master device 100 and the slave device 200 is turned off. In this case, the master device 100 and the slave device 200 may not be connected to each other even when the master device 100 or the slave device 200 attempts reconnection, and thus, power may be unnecessarily consumed.

When the master device 100 and the slave device 200 continuously attempt to connect to one another when they are unpaired, power consumption may be increased. For example, when the master device 100 and the slave device 200 are not connected at first or are connected but become unpaired, the master device 100 and the slave device 200 may not be connected to each other even if the master device 100 or the slave device 200 attempts connection. Thus, power may be unnecessarily consumed.

Figure 2:
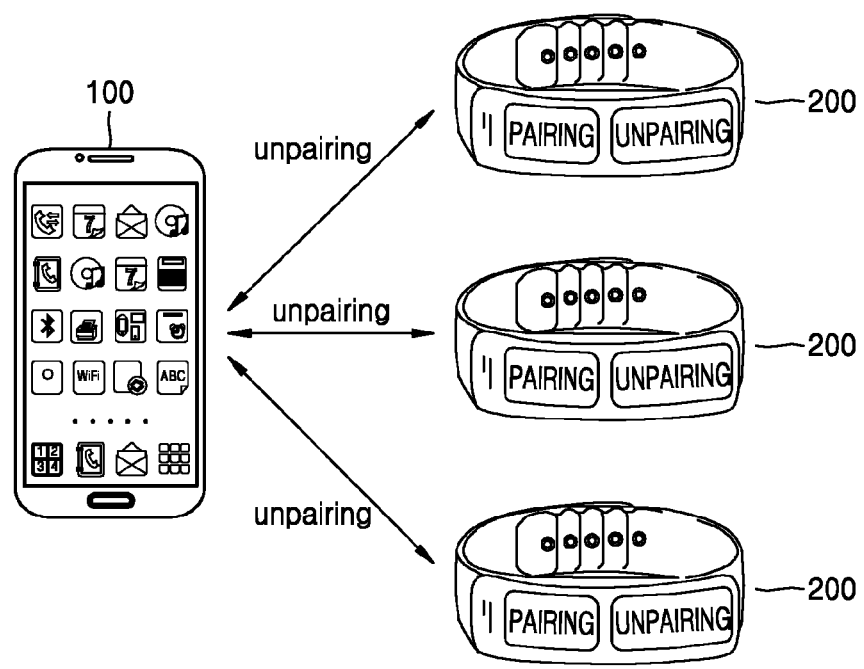
FIG. 2 is a diagram illustrating an example in which a plurality of slave devices are connected to a master device.

FIG. 2 is a diagram illustrating an example in which a plurality of slave devices 200 are connected to a master device 100. Referring to FIG. 2, three slave devices 200 are connected to one master device 100. The master device 100 may stop a reconnection attempt when unpairing messages are received from each of the three slave devices 200. Each of the slave devices 200 may transmit an unpairing message to the master device 100. The master device 100 may determine whether an unpairing message is received from each of the slave devices 200. According to the determination result, when an unpairing message is received from all of the slave devices 200, since there are no more slave devices 200 that have attempted connection, the master device 100 does not transmit a message for requesting reconnection to the slave devices 200.

Although only three slave devices 200 are illustrated in FIG. 2, when there is one master device 100 and N slave devices 200, the master device 100 does not attempt reconnection when an unpairing message is received from all of the N slave devices 200.

Figure 3:
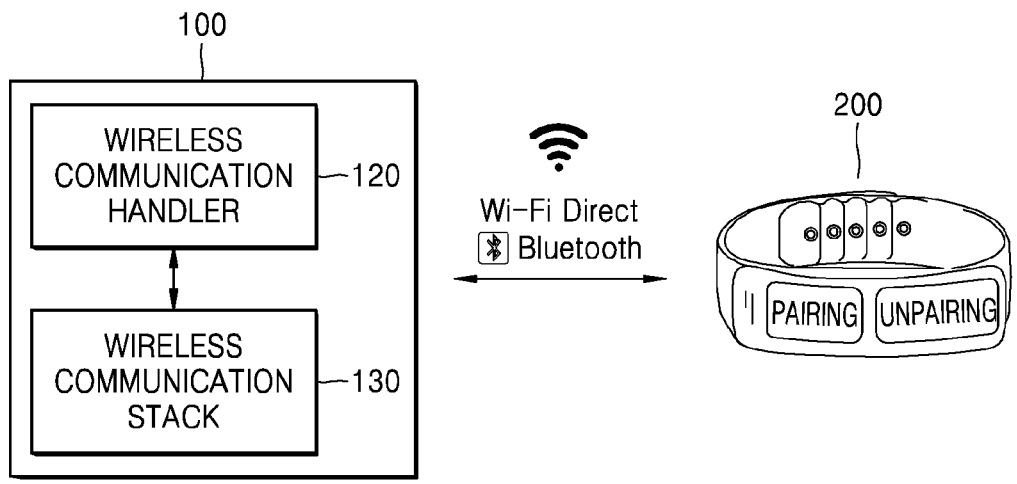
FIG. 3 is a diagram illustrating a master device and a slave device according to an exemplary embodiment.

FIG. 3 is a diagram illustrating details of the master device 100 according to an exemplary embodiment. Referring to FIG. 3, the master device 100 includes a wireless communication handler 120 and a wireless communication stack 130. The wireless communication handler 120 may be a controller and may include at least one processor. The wireless communication stack 130 may be a communication unit.

The wireless communication handler 120 may perform a pairing operation with the slave device 200, and determine whether to attempt to reconnect to the slave device 200 according to whether an unpairing message is received from the slave device 200. In other words, the wireless communication handler 120 controls wireless communication performed by the master device 100.

The wireless communication handler 120 may authenticate the slave device 200 by using data received from the slave device 200. The master device 100 may be connected to the authenticated slave device 200 via Bluetooth or Wi-Fi. Therefore, the wireless communication handler 120 may perform authentication by using the data received from the slave device 200 such as a password. When the authentication is successful, the wireless communication handler 120 may control the wireless communication stack 130 so that the wireless communication stack 130 attempts to connect the master device 100 to the slave device 200 via Bluetooth or Wi-Fi.

When an unpairing message is received from the slave device 200, the wireless communication handler 120 may control the wireless communication stack 130 so that the wireless communication stack 130 stops attempting to reconnect the master device 100 to the slave device 200. The unpairing message may terminate the authentication of the slave device 200. Therefore, after the unpairing message is received, a pairing process may be required again to reconnect the master device 100 to the slave device 200.

When an unpairing message is not received from the slave device 200, the wireless communication handler 120 may control the wireless communication stack 130 such that the wireless communication stack 130 attempts to reconnect the master device 100 to the slave device 200. Specifically, when the unpairing message is not received and the master device 100 is disconnected from the slave device 200, the wireless communication handler 120 may control the wireless communication stack 130 so that reconnection is attempted.

The wireless communication stack 130 may wirelessly communicate with the slave device 200 and transmit data to or receive data from the slave device 200 under the control of the wireless communication handler 120. The wireless communication stack 130 may actually transmit data to or receive data from the slave device 200. That is, the wireless communication stack 130 may transmit and receive data for Bluetooth or Wi-Fi connection, and transmit and receive data after being connected via Bluetooth or Wi-Fi.

The wireless communication stack 130 may receive the unpairing message in packets. For example, a packet may be 4-byte data in a file format that satisfies Bluetooth requirements.

Figure 4:
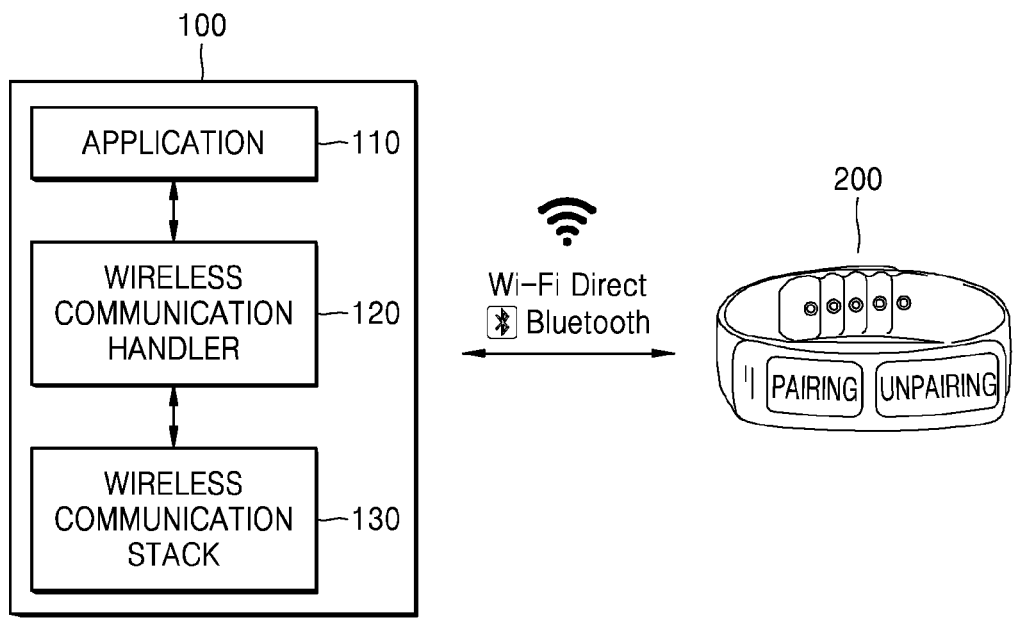
FIG. 4 is a diagram illustrating a master device and a slave device according to another exemplary embodiment.

FIG. 4 is a diagram illustrating details of the master device 100 according to another exemplary embodiment. Referring to FIG. 4, the master device 100 further includes an application 110.

The application 110 controls wireless communication connection. The application 110 may perform an operation of receiving a request from the user via the display or another input method, and output the request from the user to the wireless communication handler 120. For example, the application 110 may receive a pairing request or an unpairing request from the user, and output the pairing request or the unpairing request to the wireless communication handler 120.

The application 110 may request connection to adjacent electronic devices. When a connection request is received from the user, the application 110 may display adjacent electronic devices that are found and connect to an electronic device selected by the user. The application 110 may request the wireless communication handler 120 to connect to the selected electronic device.

The application 110 may process data via wireless communication. The application 110 may control the wireless communication handler 120 and the wireless communication stack 130 so that data stored in the master device 100 is transmitted to the slave device 200. Also, the application 110 may display data received from a slave device 200 or store the data in memory.

The wireless communication handler 120 may process a received request according to a current state of the master device 100. The wireless communication handler 120 may receive a request from the application 110 or the wireless communication stack 130. The wireless communication handler 120 may process the received request according to whether the master device 100 is paired with the slave device 200, connected to the slave device 200 via Bluetooth or Wi-Fi, or has received an unpairing message or not. For example, when the master device 100 is connected to the slave device 200 and the wireless communication stack 130 receives an unpairing message, the wireless communication handler 120 may disconnect from the slave device 200 and stop a reconnection attempt.

A display is a device for receiving a request from the user. The display may receive the request via a touch panel, a keyboard, or a display screen, etc., from the user. For example, when the display is a touch panel, letters or numbers may be determined according to a location touched by the user. The display may display an image and request the user to input a password, or display a keypad and receive letters, special characters, or numbers from the user. The display may output letters, special characters, or numbers that are input by the user to the application 110.

Figure 5:
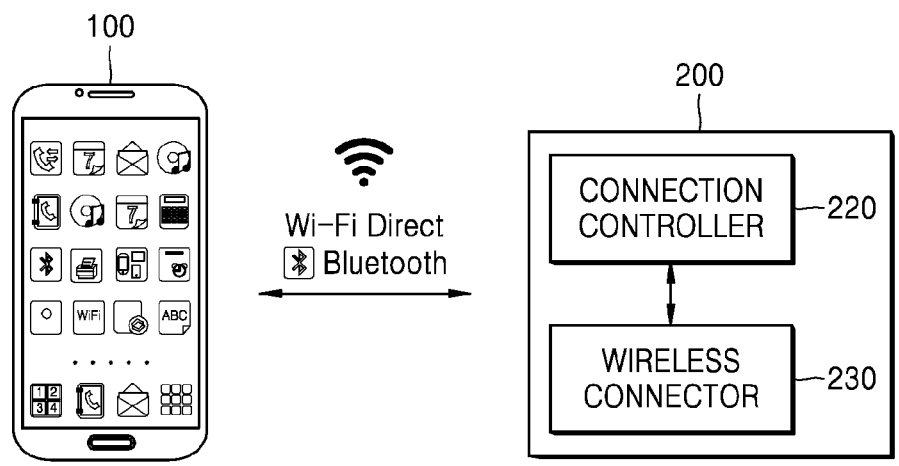
FIG. 5 is a diagram illustrating a master device and a slave device according to an exemplary embodiment.

FIG. 5 is a diagram illustrating the details of slave device 200 according to an exemplary embodiment. Referring to FIG. 5, the slave device 200 may include a connection controller 220 and a wireless connector 230. The connection controller 220 may be a controller and may include at least one processor. The wireless connector 230 may be a communication unit.

The connection controller 220 may pair the slave device 200 with the master device 100, and determine whether to attempt to reconnect the slave device 200 to the master device 100 depending on whether an unpairing message is transmitted to the master device 100.

The connection controller 220 may authenticate the master device 100 by using data received from the master device 100. The slave device 200 may be connected to the authenticated master device 100, via Bluetooth or Wi-Fi. Therefore, the connection controller 220 may perform authentication by using data received from the master device 100, e.g., a password. When authentication is successful, the connection controller 220 may control the wireless connector 230 such that the wireless connector 230 attempts to connect the slave device 200 to the master device 100 via Bluetooth or Wi-Fi.

The connection controller 220 may transmit an unpairing message according to a current state of the connection controller 220. That is, when the current state of the connection controller 220 indicates that the slave device 200 is connected to the master device 100, the connection controller 220 may generate and transmit an unpairing message to the master device 100.

When the unpairing message is transmitted to the master device 100, the connection controller 220 may control the wireless connector 230 such that the wireless connector 230 stops attempting to reconnect the slave device 200 to the master device 100. The unpairing message is for terminating the authentication of the master device 100. Therefore, after the unpairing message is transmitted, a pairing process may be required again to reconnect the slave device 200 to the master device 100.

When an unpairing message is not transmitted to the connection controller 220, the connection controller 220 may control the wireless connector 230 such that the wireless connector 230 attempts to reconnect the slave device 200 to the master device 100. Specifically, if the unpairing message is not transmitted and the master device 100 is disconnected from the slave device 200, the connection controller 220 may control the wireless connector 230 such that reconnection is attempted.

The wireless connector 230 may wirelessly communicate with the master device 100 and transmit data to or receive data from the master device 100 under the control of the connection controller 220. The wireless connector 230 may actually transmit data to or receive data from the master device 100. That is, the wireless connector 230 may transmit and receive data for a Bluetooth or Wi-Fi connection, and transmit and receive data after being connected via Bluetooth or Wi-Fi.

The wireless connector 230 may transmit the unpairing message to the master device 100 under the control of the connection controller 220. Also, the wireless connector 230 may transmit the unpairing message in packets.

Figure 6:
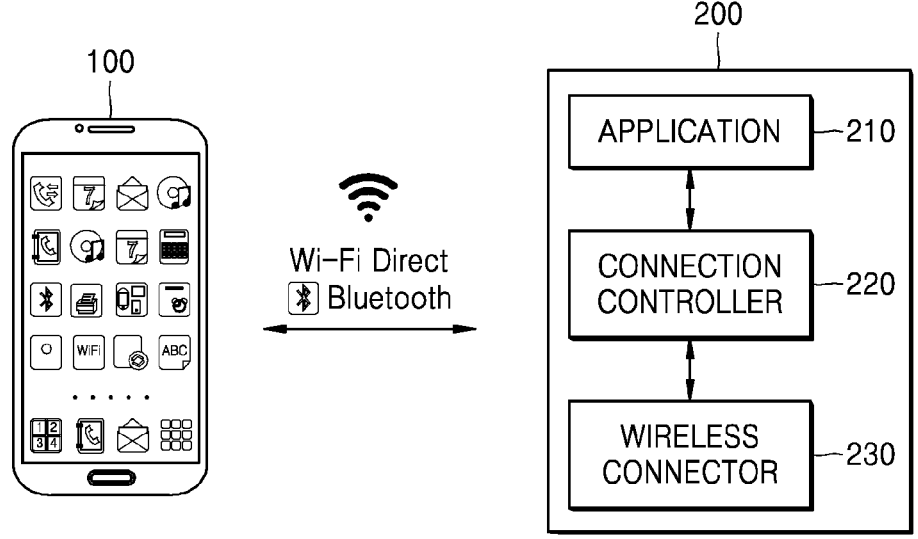
FIG. 6 is a diagram illustrating a master device and a slave device according to another exemplary embodiment.

FIG. 6 is a diagram illustrating the slave device 200 according to another exemplary embodiment. Referring to FIG. 6, the slave device 200 further includes an application 210.

The application 210 controls wireless communication connection. The application 210 may perform an operation of receiving a request from the user via the display or other input means, and output the request from the user to the connection controller 220. For example, the application 210 may receive a pairing request or an unpairing request from the user, and provide the pairing request or the unpairing request to the connection controller 220.

The application 210 may request connection to adjacent electronic devices. When a connection request is received from the user, the application 210 may display adjacent electronic devices that are found and connect to an electronic device selected by the user. The application 210 may request the connection controller 220 to connect to the selected electronic device.

The application 210 may process data via wireless communication. The application 210 may control the connection controller 220 and the wireless connector 230 so that data stored in the slave device 200 is transmitted to the master device 100. Also, the application 210 may display data received from the master device 100 or store the data in memory.

The connection controller 220 may process a received request according to a current state of the slave device 200. The connection controller 220 may receive a request from the application 210 or the wireless connector 230. The connection controller 220 may process the received request according to whether the slave device 200 is paired with the master device 100, connected to the master device 100 via Bluetooth or Wi-Fi, or has received an unpairing message or not. For example, when the slave device 200 is connected to the master device 100 and the wireless connector 230 receives an unpairing message, the connection controller 220 may disconnect from the master device 100 and stop a reconnection attempt.

Figure 7:
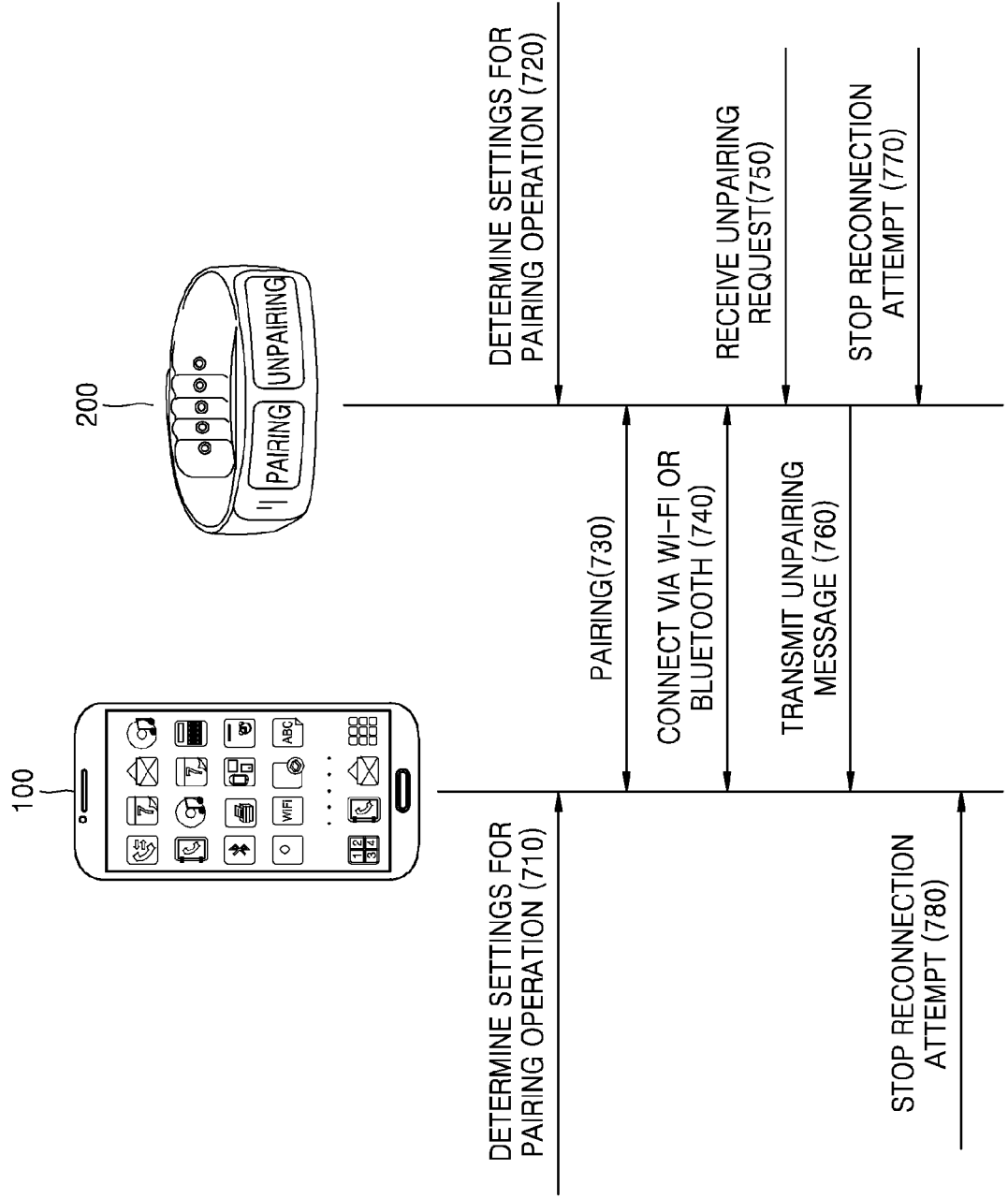
FIG. 7 is a flowchart illustrating a method of automatically reconnecting a master device and a slave device according to an exemplary embodiment.

FIG. 7 is a flowchart illustrating a method of automatically reconnecting the master device 100 and the slave device 200.

In operation 710, the master device 100 may determine settings for a pairing operation. The master device 100 may receive a pairing start request from the user, search for adjacent electronic devices, and display found adjacent electronic devices on a display screen. The master device 100 may attempt to be paired with an electronic device selected by the user from among the adjacent electronic devices displayed on the display screen.

In operation 720, the slave device 200 may determine settings for a pairing operation. The slave device 200 may receive a pairing start request from the user, search for adjacent electronic devices, and display found adjacent electronic devices on a display screen. The slave device 200 may attempt to be paired with an electronic device selected by the user from among the adjacent electronic devices displayed on the display screen.

In operation 730, the master device 100 and the slave device 200 perform the pairing operation. The master device 100 and the slave device 200 may transmit and receive authentication information, determine whether received information corresponds to stored information, and authenticate according to the determination result.

In operation 740, when the authentication is successful, the master device 100 and the slave device 200 attempt to connect to the other via Bluetooth or Wi-Fi.

In operation 750, the slave device 200 receives an unpairing request from the user. When the user wants to disconnect from the master device 100, the user may input an unpairing request.

In operation 760, the slave device 200 transmits the unpairing message to the master device 100. The slave device 200 stops the pairing operation and disconnects from the master device 100. Although the slave device 200 is unpaired from the master device 100, the master device 100 may not determine whether the master device 100 was disconnected from the slave device 200 or unpaired with the slave device 200. Therefore, the slave device 200 may send the unpairing message to the master device 100 to notify the master device 100 that the pairing operation has stopped.

In operation 770, the slave device 200 stops attempting to reconnect to the master device 100. By performing an unpairing operation, the slave device 200 and the master device 100 are unpaired and disconnected. Therefore, since the slave device 200 does not attempt to reconnect to the master device 100 even when the slave device 200 and the master device 100 are technically able to reconnect, unnecessary power consumption may be reduced.

In operation 780, the master device 100 stops attempting to reconnect to the slave device 200. Since the master device 100 received the unpairing message, the master device 100 can determine that the master device 100 is unpaired with and disconnected from the slave device 200. Therefore, since the master device 100 does not attempt to reconnect to the slave device 200 until an additional request is received from the user, unnecessary power consumption may be reduced.

Figure 8:
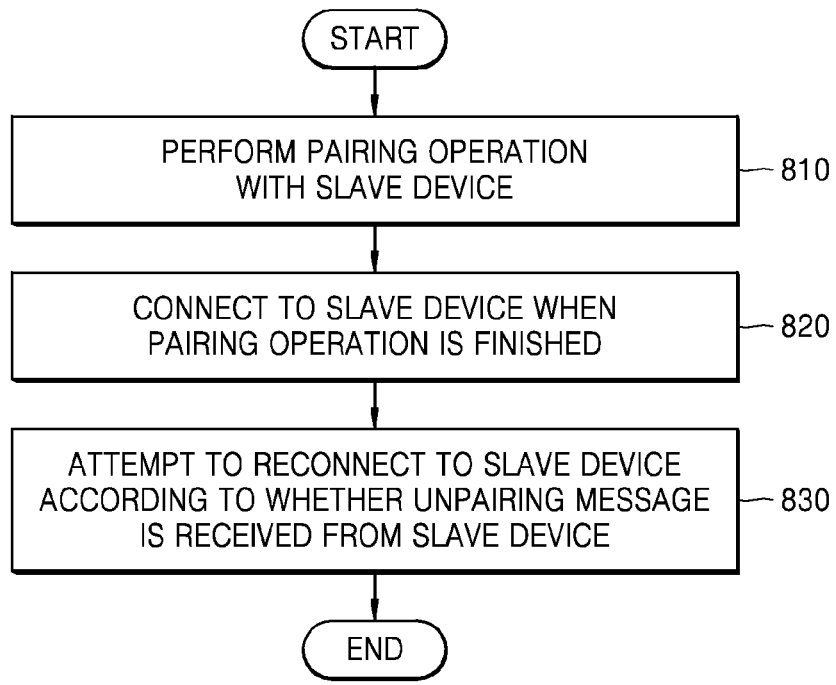
FIG. 8 is a flowchart illustrating a method of reconnecting a master device with a slave device according to an exemplary embodiment.

FIG. 8 is a flowchart illustrating a method of reconnecting the master device 100 with the slave device 200, according to an exemplary embodiment. Referring to FIG. 8, the master device 100 attempts to reconnect to the slave device 200 depending on whether an unpairing message is received.

In operation 810, the master device 100 performs a pairing operation with the slave device 200.

In operation 820, when the master device 100 is paired with the slave device 200, the master device 100 connects to the slave device 200. The master device 100 and the slave device 200 may be connected to each other via Bluetooth or Wi-Fi.

In operation 830, the master device 100 attempts to reconnect to the slave device 200 depending on whether an unpairing message is received from the slave device 200. If an unpairing message is received from the slave device 200, the master device 100 does not attempt reconnection even when the master device 100 is disconnected from the slave device 200. However, if an unpairing message is not received from the slave device 200 and the master device 100 is disconnected from the slave device 200 by some other means, the master device 100 attempts to reconnect to the slave device 200.

Figure 9:
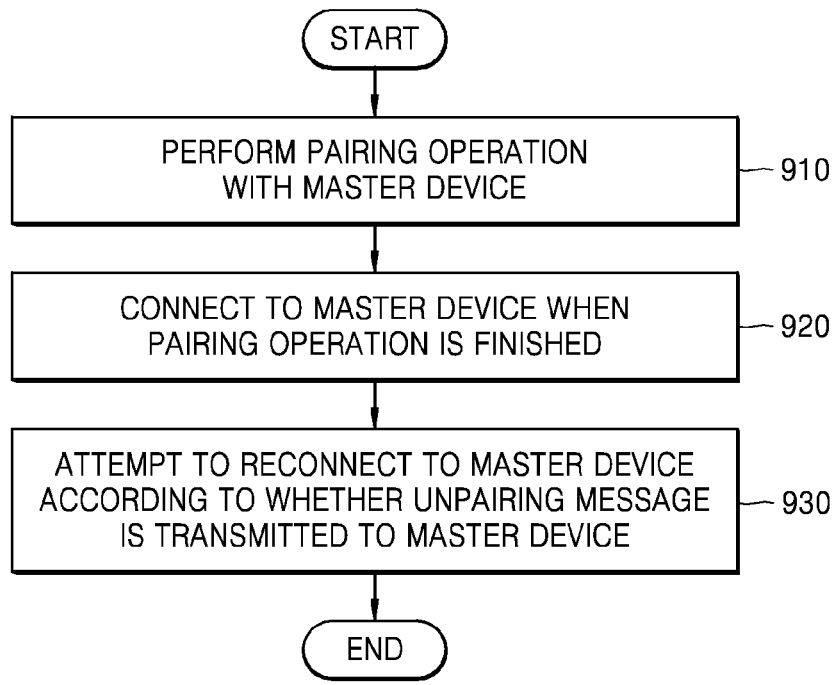
FIG. 9 is a flowchart illustrating a method of reconnecting a slave device with a master device according to an exemplary embodiment.

FIG. 9 is a flowchart illustrating a method of reconnecting the slave device 200 with the master device 100, according to an exemplary embodiment. Referring to FIG. 9, the slave device 200 attempts to reconnect to the master device 100 depending on whether an unpairing message is transmitted.

In operation 910, the slave device 200 performs a pairing operation with the master device 100.

In operation 920, when the slave device 200 is paired with the master device 100, the slave device 200 connects to the master device 100. The slave device 200 and the master device 100 may be connected to each other via Bluetooth or Wi-Fi.

In operation 930, the slave device 200 attempts to reconnect to the master device 100 depending on whether an unpairing message is transmitted to the master device 100. If an unpairing message is transmitted to the master device 100, the slave device 200 does not attempt reconnection even when the slave device 200 is disconnected from the master device 100. However, if an unpairing message is not transmitted to the master device 100 and the slave device 200 is disconnected from the master device 100, the slave device 200 attempts to reconnect to the master device 100.

Figure 10:
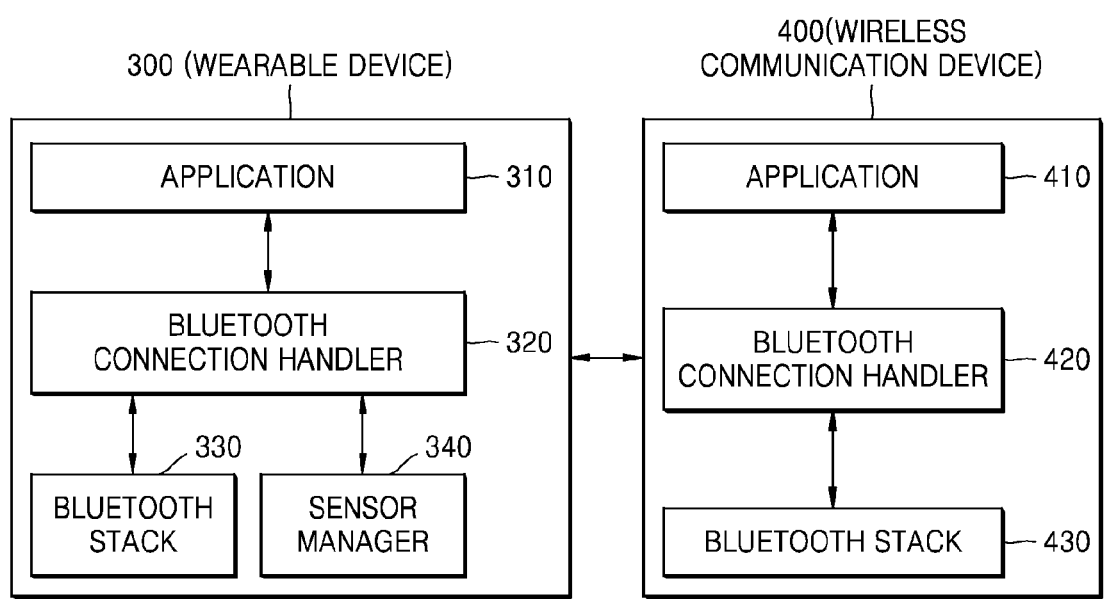
FIG. 10 is a diagram illustrating a method of reconnecting a wearable device and a wireless communication device, according to an exemplary embodiment.

FIG. 10 is a diagram illustrating a method of reconnecting a wearable device 300 and a wireless communication device 400, according to an exemplary embodiment. Referring to FIG. 10, the wearable device 300 includes an application 310, a Bluetooth connection handler 320, a Bluetooth stack 330, and a sensor manager 340. The wearable device 300 refers to an electronic device that may be worn on the body of the user, such as glasses, a bracelet, an armband, an earring, etc.

The application 310 controls operations of the wearable device 300. The application 310 transmits, receives, stores, and displays data according to a request input by the user.

The Bluetooth connection handler 320 determines a request received from the application 310 and performs state management. State management refers to processing a request received according to a current state. The Bluetooth connection handler 320 processes a pairing request or a connection request. The Bluetooth connection handler 320 may process a pairing end request or a connection end request. When there is a currently connected electronic device, the Bluetooth connection handler 320 may disregard a connection request received from another electronic device, change to a standby state, or connect to the other electronic device.

The Bluetooth connection handler 320 may determine whether a user is wearing the wearable device 300. The Bluetooth connection handler 320 may determine whether a user is wearing the wearable device 300 based on information received from the sensor manager 340.

For example, when information indicating that a heart rate of the user is detected is received from the sensor manager 340, the Bluetooth connection handler 320 determines that the user is wearing the wearable device 300.

As another example, when information indicating that a temperature of the user is detected is received from the sensor manager 340, the Bluetooth connection handler 320 determines that the user is wearing the wearable device 300.

As another example, when information indicating that an eye of the user is detected is received from the sensor manager 340, the Bluetooth connection handler 320 determines that the user is wearing the wearable device 300. If the wearable device 300 is glasses, a sensor or a camera may determine that the user is wearing the glasses when an eye of the user is at a certain location or within a certain distance.

The Bluetooth connection handler 320 may send a message indicating whether the user is wearing the wearable device 300 to the wireless communication device 400.

The Bluetooth stack 330 may be controlled by the Bluetooth connection handler 320. The Bluetooth stack 330 may connect to an adjacent electronic device via Bluetooth or transmit data to or receive data from the adjacent electronic device.

The Bluetooth stack 330 reconnects to the wireless communication device 400 only when the user is wearing the wearable device 300. The Bluetooth stack 330 receives information indicating whether the user is wearing the wearable device 300 from the Bluetooth connection handler 320. When the wearable device 300 is disconnected from the wireless communication device 400 and the user is wearing the wearable device 300, the Bluetooth stack 330 attempts to reconnect to the wireless communication device 400.

The sensor manager 340 manages various sensors included in the wearable device 300. For example, the sensors may include an acceleration sensor, a gyro sensor, and an infrared sensor. The sensor manager 340 manages operations of the sensors and signals received from the sensors.

The acceleration sensor estimates an acceleration speed generated by the movement of the wearable device 300. The acceleration sensor may provide the estimated acceleration speed to the sensor manager 340.

The gyro sensor estimates a velocity generated by the movement of the wearable device 300. The gyro sensor may provide the estimated velocity to the sensor manager 340.

The infrared sensor detects infrared rays around the wearable device 300. The infrared sensor may provide information about the detected infrared rays to the sensor manager 340.

The temperature of the user may be detected by the infrared sensor, a laser, or a thermometer. The sensor manager 340 may provide information received from the infrared sensor, the laser, or the thermometer to the Bluetooth connection handler 320.

Referring to FIG. 10, the wireless communication device 400 includes an application 410, a Bluetooth connection handler 420, and a Bluetooth stack 430. The application 410, the Bluetooth connection handler 420, and the Bluetooth stack 430 of the wireless communication device 400 perform similar operations as the application 310, the Bluetooth connection handler 320, and the Bluetooth stack 330 of the wearable device 300, respectively. Therefore, elements and features described above with regard to the application 310, the Bluetooth connection handler 320, and the Bluetooth stack 330 of the wearable device 300 may also be applied to the application 410, the Bluetooth connection handler 420, and the Bluetooth stack 430 of the wireless communication device 400.

The Bluetooth stack 430 receives a message indicating whether the user is wearing the wearable device 300 from the wearable device 300. The Bluetooth stack 430 may output the received message to the Bluetooth connection handler 420.

The Bluetooth connection handler 420 may attempt to reconnect to the wearable device 300 only when the user is wearing the wearable device 300. The Bluetooth connection handler 420 may attempt to reconnect to the wearable device 300 only when the wireless communication device 400 is disconnected from the wearable device 300 and the user is wearing the wearable device 300. In other words, in the case that the user is not wearing the wearable device 300, the Bluetooth connection handler 420 might not attempt to reconnect to the wearable device 300 even when the wireless communication device 400 is disconnected from the wearable device 300. Thus, unnecessary power consumption may be reduced.

Figure 11:
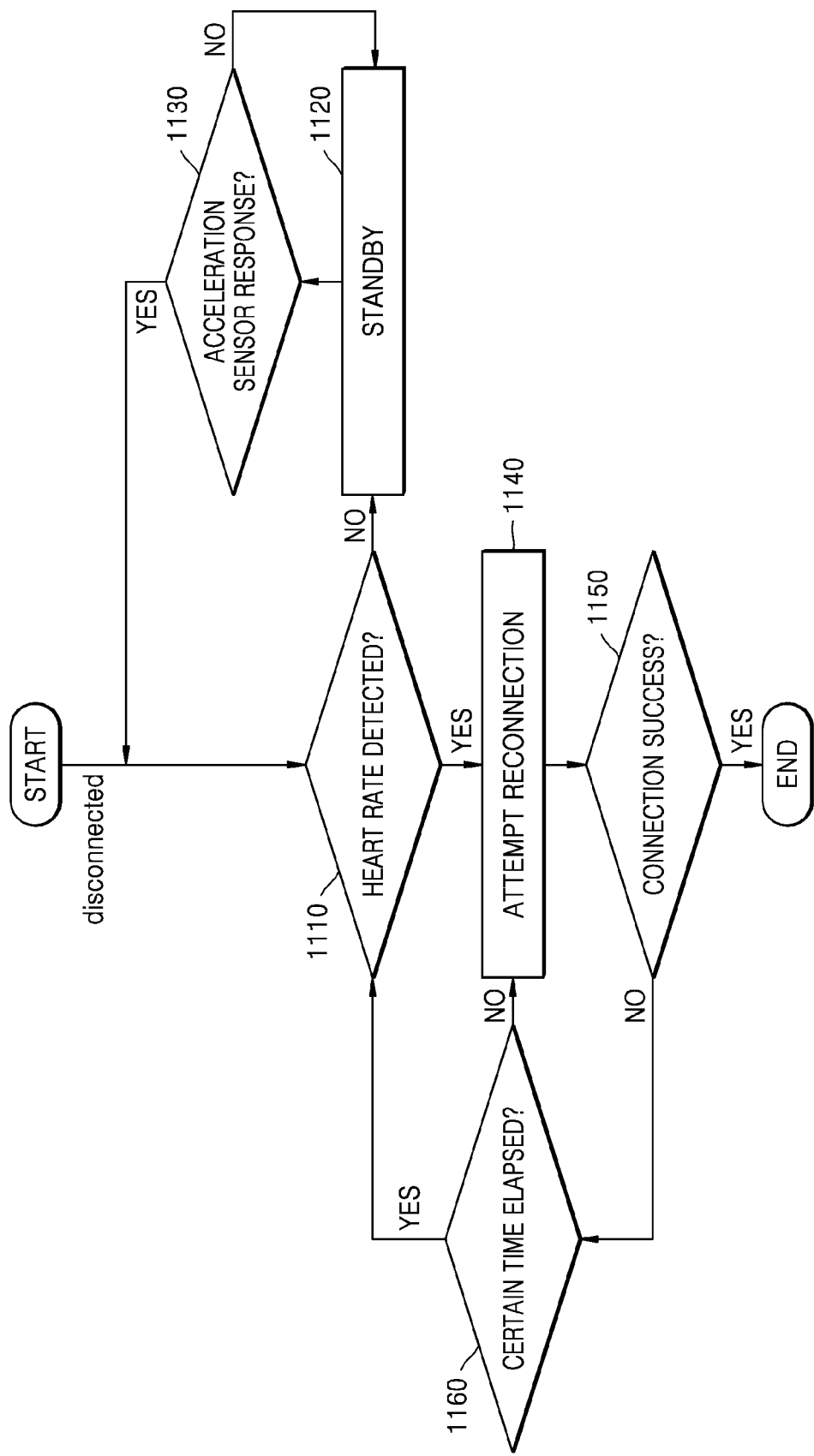
FIG. 11 is a flowchart illustrating a method of reconnecting a wearable device with a wireless communication device according to an exemplary embodiment.

FIG. 11 is a flowchart illustrating a method of reconnecting the wearable device 300 with the wireless communication device 400, according to an exemplary embodiment. Referring to FIG. 11, the wearable device 300 may determine whether the user is wearing the wearable device 300 and reconnect to the wireless communication device 400 depending on the determination result.

In operation 1110, when the wearable device 300 is disconnected from the wireless communication device 400, the wearable device 300 monitors a heart rate of the user. If the heart rate of the user is detected, the method proceeds to operation 1140, if not, the method proceeds to operation 1120. Disconnection may occur when a distance between the wearable device 300 and the wireless communication device 400 is too large to transmit and receive data via Bluetooth, when the user has turned off the wearable device 300 or the wireless communication device 400, or when the user has ended communication via Bluetooth. When the wearable device 300 and the wireless communication device 400 are disconnected from each other, the wearable device 300 and the wireless communication device 400 may automatically attempt reconnection. However, attempting reconnection even in a case when the user is not wearing the wearable device 300 and not using the wearable device 300 may unnecessarily consume power.

When the heart rate of the user is detected, the wearable device 300 may determine that the user is wearing the wearable device 300. Therefore, the method may proceed to operation 1140 and the wearable device 300 may attempt to reconnect to the wireless communication device 400. Although FIG. 11 only illustrates an example of monitoring the heart rate of the user, the wearable device 300 may also detect the temperature of the user to determine whether the user is wearing the wearable device 300.

The wearable device 300 may send a message to the wireless communication device 400 when the heart rate of the user is detected. That is, the wearable device 300 may send a message indicating that the user is wearing the wearable device 300 to the wireless communication device 400.

In operation 1120, the wearable device 300 maintains a standby mode. Since the user may not be wearing the wearable device 300, the wearable device 300 is on standby until the user wears the wearable device 300.

In operation 1130, the wearable device 300 determines whether the acceleration sensor responded. If the acceleration sensor responds, the method proceeds to operation 1110; otherwise, the method proceeds to operation 1120. The wearable device 300 recognizes the response of the acceleration sensor as a trigger and restarts monitoring the heart rate of the user. When the acceleration sensor responds, this may be determined as the user starting to use the wearable device 300. Therefore, since the heart rate of the user may be monitored only when the acceleration sensor responds, unnecessary power consumption may be reduced. Although FIG. 11 only describes an acceleration sensor, other sensors capable of detecting the movement of the wearable device 300 may function in the same manner as the acceleration sensor.

In operation 1140, the wearable device 300 may attempt to reconnect to the wireless communication device 400. The wearable device 300 may determine that the user is wearing the wearable device 300, and automatically attempt to reconnect to the wireless communication device 400. Therefore, since the wearable device 300 attempts to reconnect to the wireless communication device 400 only when the user is wearing the wearable device 300, unnecessary power consumption may be reduced.

In operation 1150, the wearable device 300 determines whether the wearable device 300 is successfully connected to the wireless communication device 400. If the connection is successful, the wearable device 300 ends the reconnecting operation; otherwise, if not, the method proceeds to operation 1160. The wearable device 300 may fail to connect to the wireless communication device 400 even when the user is wearing the wearable device 300. In this case, the wearable device 300 attempts reconnection with the wireless communication device 400 within a certain amount of time. The amount of time may be predetermined or may be set by a user.

In operation 1160, the wearable device 300 may determine whether a certain amount of time has elapsed. If the certain amount of time has elapsed, the method proceeds to operation 1110; otherwise, if not, the wearable device 300 proceeds to operation 1140. The wearable device 300 may attempt reconnection with the wireless communication device 400 within the certain amount of time, and if reconnection fails within the certain amount of time, the wearable device 300 may determine whether the heart rate of the user is detected and attempts reconnection again.

According to operations 1110 to 1160, since the wearable device 300 attempts to reconnect to the wireless communication device 400 only when the user is wearing the wearable device 300, it is possible to prevent the wearable device 300 from unnecessarily attempting reconnection when the user is not wearing the wearable device 300.

Figure 12:
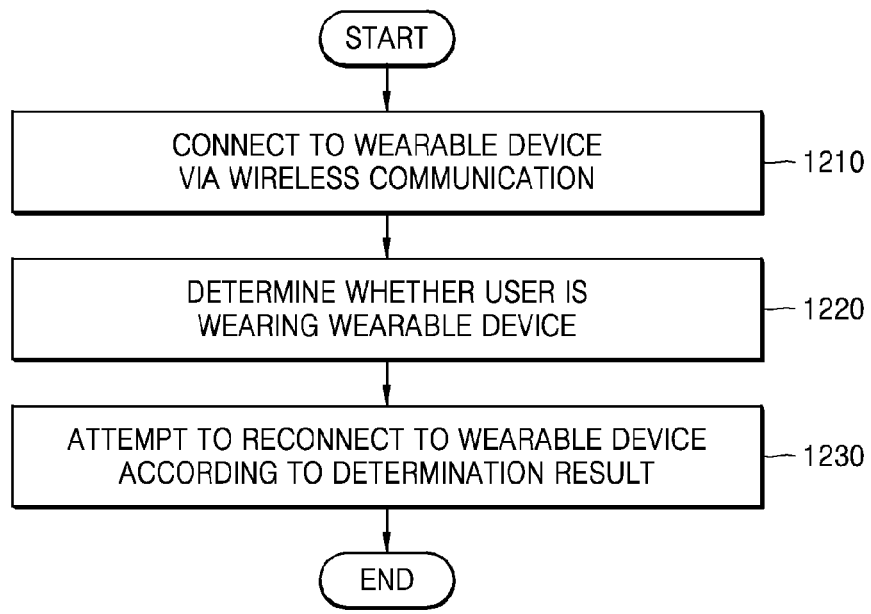
FIG. 12 is a flowchart illustrating a method of reconnecting a wireless communication device with a wearable device, according to an exemplary embodiment.

FIG. 12 is a flowchart illustrating a method of reconnecting the wireless communication device 400 with the wearable device 300, according to an exemplary embodiment. Referring to FIG. 12, the wireless communication device 400 may attempt to reconnect to the wearable device 300 only when the user is wearing the wearable device 300 so that unnecessary power consumption is reduced.

In operation 1210, the wireless communication device 400 is connected to the wearable device 300 via wireless communication. Wireless communication refers to communication over short distances such as Bluetooth or Wi-Fi.

In operation 1220, the wireless communication device 400 determines whether the user is wearing the wearable device 300. The wireless communication device 400 may receive a message indicating whether the user is wearing the wearable device 300. The wearable device 300 may determine whether the user is wearing the wearable device 300 depending on whether the heart rate of the user is detected or whether the temperature of the user is detected. Therefore, the wearable device 300 may send the message to the wireless communication device 400. The wireless communication device 400 may determine whether the user is wearing the wearable device 300 based on information in the message.

In operation 1230, the wireless communication device 400 may attempt to reconnect to the wearable device 300 according to the determination result. When the user is wearing the wearable device 300 and the wireless communication device 400 is disconnected from the wearable device 300, the wireless communication device 400 attempts to reconnect to the wearable device 300. If the user is not wearing the wearable device 300, the wireless communication device 400 does not attempt reconnection even when the wireless communication device 400 is disconnected from the wearable device 300.

The wearable device 300 determines whether the user is wearing the wearable device 300, and sends a message indicating whether the user is wearing the wearable device 300 to the wireless communication device 400. When the user is not wearing the wearable device 300, the wearable device 300 does not attempt to reconnect to the wireless communication device 400 even when the wearable device 300 is disconnected from the wireless communication device 400. When the user is wearing the wearable device 300, the wearable device 300 attempts to reconnect to the wireless communication device 400 when the wearable device 300 is disconnected from the wireless communication device 400.

When the wireless communication device 400 and the wearable device 300 are paired but disconnected, the wireless communication device 400 and the wearable device 300 continuously attempt to connect to one another and thus consume power. For example, the wireless communication device 400 and the wearable device 300 may be paired but disconnected when a distance between the wireless communication device 400 and the wearable device 300 is increased while they are connected to each other, when one of the wireless communication device 400 and the wearable device 300 stops wireless communication, or when one of the wireless communication device 400 and the wearable device 300 is turned off. In this case, the wireless communication device 400 and the wearable device 300 may not be connected to each other even when the wireless communication device 400 or the wearable device 300 attempts reconnection, and thus, power is unnecessarily consumed.

When the wireless communication device 400 and the wearable device 300 attempt to connect to one another when they are unpaired, power consumption may be increased. For example, when the wireless communication device 400 and the wearable device 300 are not connected at first or are connected but unpaired, the wireless communication device 400 and the wearable device 300 may not be connected to each other even when the wireless communication device 400 or the wearable device 300 attempts connection, and thus, power is unnecessarily consumed.

Figure 13:
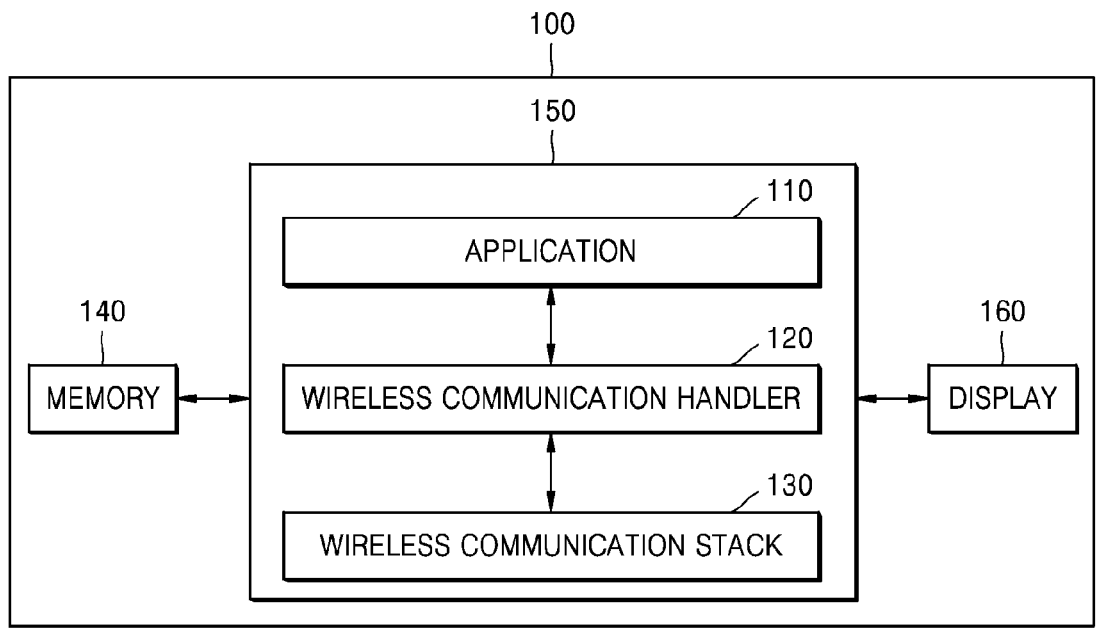
FIG. 13 is a block diagram illustrating a master device according to an exemplary embodiment.

FIG. 13 is a block diagram illustrating the master device 100 according to an exemplary embodiment. The master device 100 includes a memory 140, a controller 150, and a display 160.

The memory 140 stores data and software modules used by the master device 100.

The controller 150 controls operations of the master device 100. The controller 150 may load the software module stored in the memory 140.

The controller 150 includes the application 110, the wireless communication handler 120, and the wireless communication stack 130. The controller 150 may load the software modules stored in the memory 140 which respectively correspond to the application 110, the wireless communication handler 120, and the wireless communication stack 130, and drive the application 110, the wireless communication handler 120, and the wireless communication stack 130. For example, the wireless communication stack 130 may be a Bluetooth communication module or a Wi-Fi communication module.

The controller 150 may be an application processor (AP) or a central processing unit (CPU).

The display 160 displays information according to a request from the controller 150. The display 160 may detect an input of the user, such as a touch input, and provide the input to the controller 150.

Figure 14:
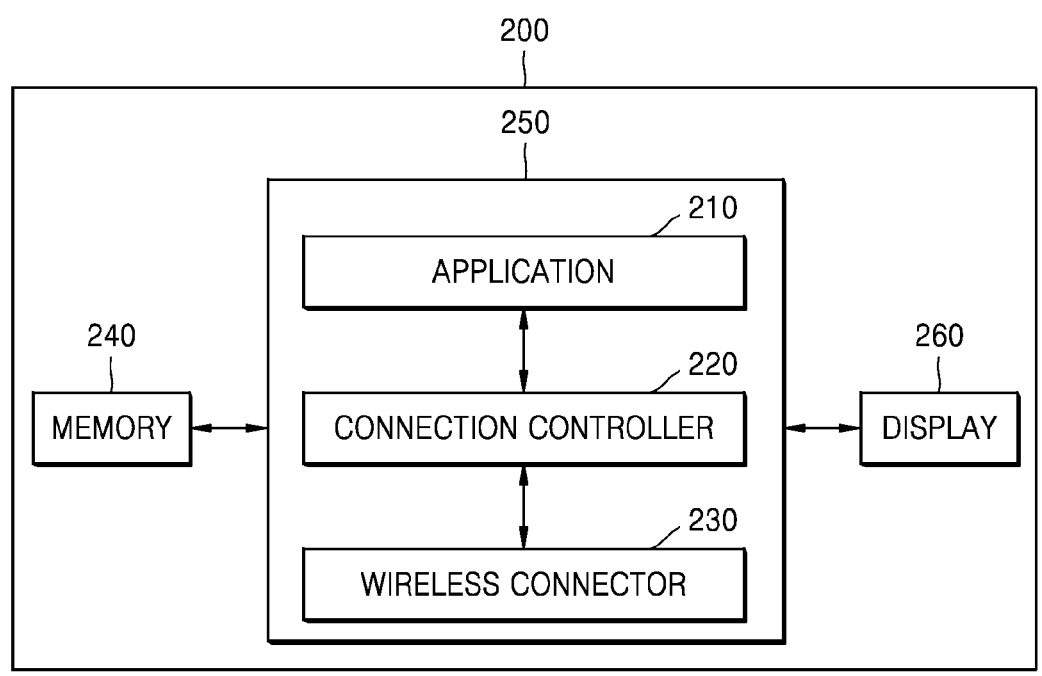
FIG. 14 is a block diagram illustrating a slave device according to an exemplary embodiment.

FIG. 14 is a block diagram illustrating the slave device 200 according to an exemplary embodiment. The slave device 200 includes a memory 240, a controller 250, and a display 260.

The memory 240 stores data and software modules used by the slave device 200.

The controller 250 controls operations of the slave device 200. The controller 250 may load the software modules stored in the memory 240.

The controller 250 includes the application 210, the connection controller 220, and the wireless connector 230. The controller 250 may load the software modules stored in the memory 240 which respectively correspond to the application 210, the connection controller 220, and the wireless connector 230, and drive the application 210, the connection controller 220, and the wireless connector 230. For example, the wireless connector 230 may be a Bluetooth communication module or a Wi-Fi communication module.

The controller 250 may be an AP or a CPU.

The display 260 displays information according to a request from the controller 250. The display 260 may detect an input of the user, such as a touch input, and provide the input to the controller 250.

The master device 100 may perform functions of the wireless communication device 400, and the slave device 200 may perform functions of the wearable device 300. Therefore, elements and features of the wireless communication device 400 and the wearable device 300 may also be respectively applied to the master device 100 and the slave device 200.

As described above, according to the one or more of the above exemplary embodiments, a master device may attempt to reconnect to a slave device according to whether an unpairing message is received from the slave device. The slave device according to an exemplary embodiment may attempt to reconnect to the master device according to whether the unpairing message is transmitted to the master device. The slave device according to an exemplary embodiment may transmit the unpairing message to the master device when an unpairing request is received from a user, and stop attempting to reconnect to the master device. A wireless communication device according to an exemplary embodiment may attempt to reconnect to a wearable device according to whether the user is wearing the wearable device. The wearable device according to an exemplary embodiment may attempt to reconnect to the wireless communication device according to whether the user is wearing the wearable device.

The device described herein may comprise a processor, a memory for storing program data and executing the program, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network-coupled computer systems so that the computer-readable code is stored and executed in a distributive manner. This media can be read by the computer, stored in the memory, and executed by the processor.

The inventive concepts may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, if the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concepts could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of inventive concepts and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a," "an," "the," and similar referents in the context of describing inventive concepts (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made without departing from the spirit and scope as defined by the following claims.

What is claimed is:

1. A method performed by a master device of automatically reconnecting the master device and a slave device, which is a wearable device, the method comprising:
    performing a pairing operation with the slave device;
    connecting to the slave device in response to completing the pairing operation;
    receiving a message indicating whether a user is wearing the slave device; and
    in response to being disconnected from the slave device, automatically attempting to reconnect to the slave device until an unpairing message is received from a user via an input unit at the slave device,
    in response to the unpairing message being received from a user via an application or the slave device, not attempting to reconnect to the slave device until a pairing message is received, and terminating an authentication between the master device and the slave device such that a new pairing operation must be performed to reconnect to the slave device, and
    in response to the message being received from the slave device that indicates the user is not wearing the slave device, not attempting to reconnect to the slave device.

2. A method performed by a slave device, which is a wearable device, of automatically reconnecting a master device and the slave device, the method comprising:
- performing a pairing operation with the master device;
- connecting to the master device in response to completing the pairing operation;
- transmitting a message indicating whether a user is wearing the slave device; and
- in response to being disconnected from the master device, automatically attempting to reconnect to the master device until an unpairing request is received from a user via an input unit at the slave device,
- in response to the unpairing request being received from a user via an application or the slave device, not attempting to reconnect to the master device until a pairing request is received, and terminating an authentication between the master device and the slave device such that a new pairing operation must be performed to reconnect to the master device, and
- in response to the message being transmitted to the master device that indicates the user is not wearing the slave device, not attempting to reconnect to the master device.

3. The method of claim 2, wherein the attempting to reconnect to the master device comprises attempting reconnection while an unpairing message is not transmitted to the master device.

4. The method of claim 3, wherein the unpairing message is transmitted in packets.

5. The method of claim 2, wherein the master device and the slave device are wirelessly connected to each other via Bluetooth.

6. The method of claim 2, wherein the performing the pairing comprises authenticating the master device.

7. The method of claim 2, wherein the attempting to reconnect to the master device comprises transmitting an unpairing message in response to receiving the unpairing request from the user via the application.

8. A master device comprising:
- a controller configured to perform a pairing operation with a slave device, which is a wearable device, and, in response to the slave device disconnecting from the master device, automatically attempt to reconnect to the slave device until an unpairing message is received from the slave device; and
- a communication unit configured to perform wireless communication with the slave device under the control of the controller,
- wherein the controller is further configured to:
  - control the communication unit to receive a message indicating whether a user is wearing the slave device,
  - in response to receiving the unpairing message from a user via an application or an input unit at the slave device, control the communication unit to stop attempting to reconnect to the slave device until a pairing message is received, and terminate an authentication between the master device and the slave device such that a new pairing operation must be performed to reconnect to the slave device, and
  - in response to the message being received from the slave device that indicates the user is not wearing the slave device, not attempt to reconnect to the slave device.

9. A slave device, which is a wearable device, the slave device comprising:
- a controller configured to:
  - perform a pairing operation with a master device and, in response to the master device disconnecting from the slave device, automatically attempt to reconnect to the master device until an unpairing request is received; and
- a communication unit configured to perform wireless communication with the master device under the control of the controller,
- wherein the controller is further configured to:
  - control the communication unit to transmit a message indicating whether a user is wearing the slave device,
  - in response to receiving the unpairing request from a user via an application or an input unit at the slave device, control the communication unit to stop attempting to reconnect to the master device until a pairing request is received, and terminate an authentication between the master device and the slave device such that a new pairing operation must be performed to reconnect to the master device, and
  - in response to the message being transmitted to the master device that indicates the user is not wearing the slave device, not attempt to reconnect to the master device.

10. The slave device of claim 9, wherein the controller is configured to, while an unpairing message is not transmitted to the master device, attempt to reconnect to the master device.

11. The slave device of claim 10, wherein the communication unit is configured to transmit the unpairing message in packets.

12. The slave device of claim 9, wherein the master device and the slave device are configured to be wirelessly connected to each other via Bluetooth.

13. The slave device of claim 9, wherein the controller is configured to authenticate the master device by using data received from the master device.

14. The slave device of claim 9, further comprising an application processor configured to receive a command from a user and provide the command to the controller, and wherein the controller is configured to, when the unpairing request is received from the user, control the communication unit to transmit an unpairing message to the master device.

* * * * *